J. Zimmer,
Making Wooden Screws.
Nº 8,620.      Patented Dec. 23, 1851.
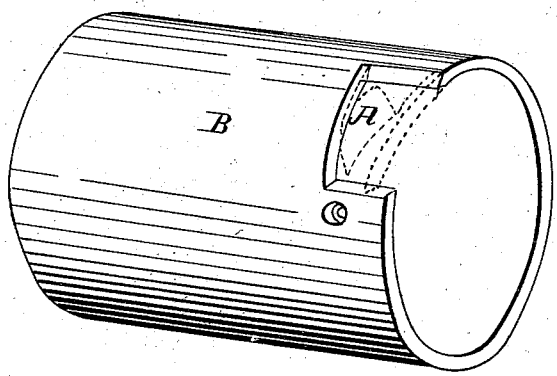
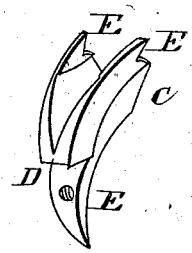
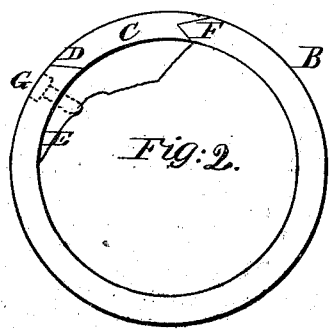

UNITED STATES PATENT OFFICE.

JACOB ZIMMER, OF TIFFIN, OHIO.

ATTACHING CUTTERS FOR CUTTING SCREWS ON RAILS OF BEDSTEADS.

Specification of Letters Patent No. 8,620, dated December 23, 1851.

*To all whom it may concern:*

Be it known that I, JACOB ZIMMER, of the city of Tiffin, in the county of Seneca and State of Ohio, have invented a new and useful Improvement in the Manner of Securing V-Shaped Cutters in Rotary Cylindrical Heads for Cutting Screws on Tenons of Bedstead-Rails; and I do hereby declare the following to be a full and clear description thereof, reference being had to the annexed drawings of the same, making part of this specification.

Figure 1 represents a perspective view of the cylindrical head with its V shaped cutter removed. Fig. 2, is an end view of the cylinder head and cutter. Fig. 3, is a perspective view of the V shaped cutter.

The same letters of reference indicate the same parts on the figures.

I am aware that V shaped cutters have been secured in rotary cylindrical heads for cutting screws on tenons of bedstead rails, in various ways, such as letting the tapered end of the shank of the cutter, into a recess on the exterior portion of the cylindrical head and bringing the angular shoulder of the underside of the shank against the smaller end of the opening through which the front part of the cutter projects, and sustaining the beveled points of the latter against the interior beveled surface of the cylindrical head. But I am not aware that V shaped cutters have been confined in rotating cylindrical heads in the manner following; that is to say, forming an opening A in the end of the cylinder head B in such a manner, as to allow the V shaped cutter C to be placed laterally therein, or inserted sidewise into its seat, and confined by means of an angular shoulder D formed on the upper side of the shank E and embracing one end of the opening A in the cylinder B, and by angular notches F, F, at the front of the cutter, embracing that portion of the cylinder, corresponding therewith in form, and using only in connection therewith a screw bolt G simply to retain the cutter C, in the opening A or prevent its movement laterally. It will thus be seen that the V shaped cutter can be inserted and secured in the cylindrical head with the utmost facility, and rendered perfectly firm, requiring no adjustment whatever, the form of the cutter exactly fitting the side, and ends of the opening in the cylinder head. The head of the confining screw bolt G is countersunk in the cylinder, and the shank thereof passes through the shank E of the cutter. The front ends of the cutter in which are the angular notches F are increased in thickness as seen in Fig. 3, for resisting the thrust of the cutter centerward or otherwise, during the operation of cutting screws.

Having thus described my improvement in securing V shaped cutters in rotary cylinder heads for cutting screws on tenons of bedstead rails, I wish it to be understood that all I claim as my invention and desire to secure by Letters Patent, is—

Forming an opening A in the end of the cylindrical head B so as to allow the cutter C, to be placed therein laterally, or inserted into its seat sidewise, and securely confined in the manner herein-before set forth whereby the cutter C requires no adjustment, and is retained firmly in its position.

In testimony whereof I have hereunto signed my name before two subscribing witnesses.

JACOB ZIMMER.

Witnesses:
JAS. P. POLLARS,
CHARLES CRONISE.